(12) United States Patent
Yokohama (10) Patent No.: US 6,781,348 B2
(45) Date of Patent: Aug. 24, 2004

(54) METHOD OF CHARGING A STORAGE BATTERY

(75) Inventor: Yutaka Yokohama, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/396,828

(22) Filed: Mar. 26, 2003

(65) Prior Publication Data

US 2003/0184261 A1 Oct. 2, 2003

(30) Foreign Application Priority Data

Mar. 27, 2002 (JP) ........................................ 2002-088542

(51) Int. Cl.[7] ............................................. H01M 10/44
(52) U.S. Cl. ..................................................... 320/125
(58) Field of Search ................................ 320/124, 125, 320/131, 132, 160, DIG. 17, DIG. 21

(56) References Cited

U.S. PATENT DOCUMENTS 5,192,905 A * 3/1993 Karlin et al. ............... 320/145
5,367,244 A * 11/1994 Rose et al. ................. 320/141
5,561,360 A * 10/1996 Ayres et al. ................ 320/129
5,589,757 A * 12/1996 Klang ........................ 320/160

* cited by examiner

Primary Examiner—Edward H. Tso
(74) Attorney, Agent, or Firm—Smith, Gambrell & Russell, LLP (57) ABSTRACT

A method of charging a storage battery comprising executing an $n(n \geq 2)$-stage constant current charging process charging the battery with a constant current while monitoring a terminal voltage of the battery, the current decreasing stepwise n−1 times every time the terminal voltage coincides with a current switching voltage. The method further comprises measuring a depth of discharge of the battery immediately before charging and executing an additional charging process before the n-stage constant current charging process when the depth of discharge is deeper than a reference depth of discharge, the additional charging process charging the battery with an additional constant current larger than an initial current in the n-stage constant current charging process and switching the additional current to the initial current when the terminal voltage coincides with the current switching voltage, so as to attain a rapid charging of the battery at a low cost.

12 Claims, 9 Drawing Sheets

METHOD OF CHARGING A STORAGE BATTERY

BACKGROUND OF THE PRESENT INVENTION

1. Field of the Present Invention

The present invention relates to a method of charging a storage battery comprising executing an $n(n \geq 2)$-stage constant current charging process charging the battery with a constant current while monitoring a terminal voltage of the battery, the current decreasing stepwise $n-1$ times every time the terminal voltage coincides with a current switching voltage, in particular, the method of charging which can charge the battery very quickly and prevent a reduction in the life of the battery.

2. Discussion of the Related Art

Figure 10:
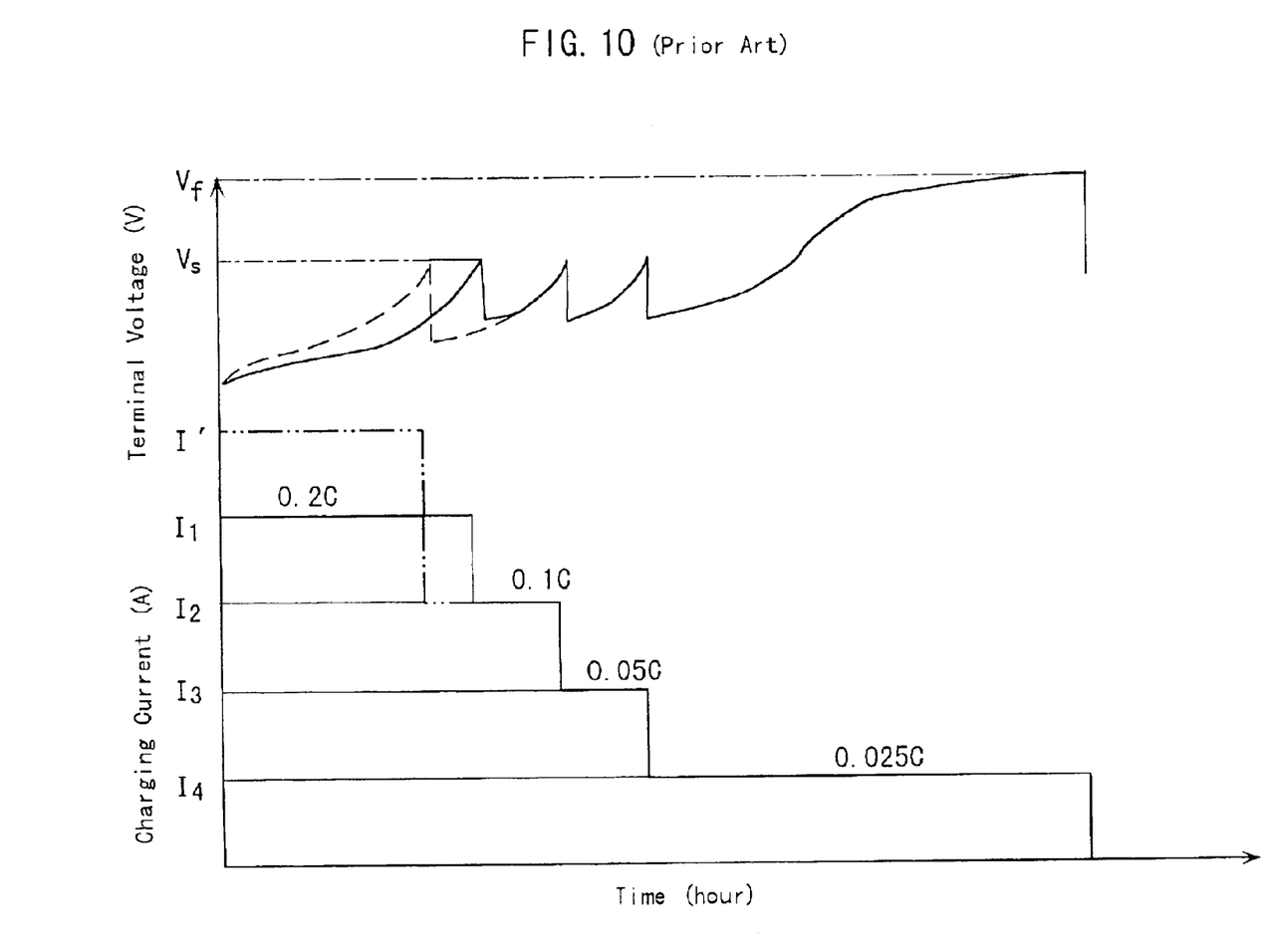
FIG. 10 is a diagram showing a change of a current and a terminal voltage with time in a method of charging with a four-stage constant current process known in the prior art.

An $n(n \geq 2)$-stage constant current charging process as disclosed in, for example, JP-A-61/26438, is suitable for charging a storage battery quickly. Therefore, the process is applied for various kinds of storage batteries, preferably lead storage batteries, in particular the lead storage batteries for electric vehicles. FIG. 10 shows a change of a current I for charging and a terminal voltage V of the battery with time in the four-stage constant current process. In this process, the currents $I_1, I_2, I_3, I_4$ of respective stages are set so that the current I for charging decreases stepwise as the stage progresses. At first, the current $I_1$ in the first stage is applied to the battery while the terminal voltage V is monitored. The current $I_1$ is switched to the current $I_2$ in the second stage when the terminal voltage V coincides with a current switching voltage $V_s$. The current I for charging is similarly switched twice more every time the terminal voltage V coincides with the current switching voltage $V_s$. The process stops when the terminal voltage V in the fourth stage reaches a final charge voltage $V_f$ of the battery.

In the method of charging the battery with the n-stage constant current process, the current for charging the storage battery is frequently restricted to a relatively low current in consideration of temperature increase and deterioration of the battery. For example, the constant current $I_1, I_2, I_3, I_4$ in each stage is that corresponding to, respectively, 0.2C (C: a rated capacity of the battery), 0.1C, 0.05C and 0.025C in the four-stage constant current charging process as shown in FIG. 10.

Therefore, the storage battery takes a long time to be charged with the n-stage constant current process when the battery is deeply discharged. It is desirable that the battery is charged within a time during which a discount commercial electric power rate is applied. However, it is often impossible to fully charge a severely discharged battery with the n-stage constant current charging process within the desirable time.

One of the measures to shorten a charging time is to increase the constant current $I_1'$ in the first stage as shown with an imaginary line of FIG. 10. However, the charging time does not notably decrease in total, because the charging time in the second stage gets longer though the terminal voltage in the first stage coincides with the current switching voltage $V_s$ faster. Furthermore, long charging time with large current frequently leads to deterioration of the battery.

OBJECT AND SUMMARY OF THE PRESENT INVENTION

It is therefore an object of the present invention to provide a method of charging a storage battery which makes it possible to charge the battery very quickly.

It is another object of the present invention to provide a method of charging the battery which can prevent a reduction in the life of the battery.

It is a further object of the present invention to provide a method of charging the battery which can level off commercial electric power consumption per hour.

The above objects are achieved based on a method of charging a storage battery, preferably a lead storage battery, in particular the lead storage battery for an electric vehicle, comprising executing an $n(n \geq 2)$-stage constant current charging process charging the battery with a constant current while monitoring a terminal voltage of the battery, the current decreasing stepwise $n-1$ times every time the terminal voltage coincides with a current switching voltage.

The method of the present invention further comprises measuring a depth of discharge of the battery immediately before charging and executing an additional charging process before the n-stage constant current charging process when the depth of discharge is deeper than a reference depth of discharge, the additional charging process charging the battery with an additional constant current larger than an initial current in the n-stage constant current charging process and switching the additional current to the initial current when the terminal voltage coincides with the current switching voltage.

The reference depth of discharge is predetermined so that the storage battery having the reference depth of discharge is fully charged with the n-stage constant current charging process at the end of a time permitted for charging. The time permitted for charging depends on the kind and the usage of the battery, and is preferably the time during which a discount commercial power rate is applied.

Time required for charging is largely shortened by the additional charging process according to the present invention. Therefore, it is possible to fully charge a severely discharged battery within the time permitted for charging, for example, within the time during which the discount commercial power rate is applied.

In the method of the present invention, the additional current in the additional charging process is preferably set so that the additional current increases stepwise or continuously as the depth of discharge of the battery increases. Temperature increase and deterioration of the battery during the additional process can be controlled by this method.

The method of the present invention can further comprise selecting one of a normal charging mode and an additional charging mode. In this method, the additional charging process is executed only when the additional charging mode is selected and the depth of discharge is deeper than the reference depth of discharge. That is, the additional charging process is carried out as required.

The method of the present invention can further comprise detecting a starting time of charging. In this method, the additional charging process is executed only when the starting time of charging is within a time predetermined for charging and the depth of discharge is deeper than the reference depth of discharge. The additional charging process can be executed only when the starting time of charging is within a time predetermined for each of the battery so as to level off commercial electric power consumption per hour. This method advantageously contributes toward leveling off the commercial electric power consumption per hour. The additional charging process can be executed only when the starting time of charging is within the time during which the discount commercial electric power rate is applied. The method leads to a low cost charging as well as the leveling off the electric power consumption per hour.

The method can further comprise detecting a temperature of the storage battery immediately before charging. In this method, the additional charging process is executed only when the temperature of the battery is lower than a temperature at which a reduction in the life of the battery begins to accelerate and the depth of discharge is deeper than the reference depth of discharge. Temperature increase of the battery, which leads to thermal runaway and deterioration of the battery, is prevented by this method. The current of the additional charging process is preferably set so that the current of the additional charging process decreases stepwise or continuously as the temperature of the battery increases in this method. The temperature increase and deterioration of the battery during the additional process can be minimized by the method.

BRIEF DESCRIPTION OF THE DRAWINGS

The present invention is explained in further detail below with the reference to the drawings, in which.

DETAILED DESCRIPTION OF THE PRESENT INVENTION

Preferable embodiments of the present invention will be described with reference to the drawings.

(First Embodiment)

Figure 1:
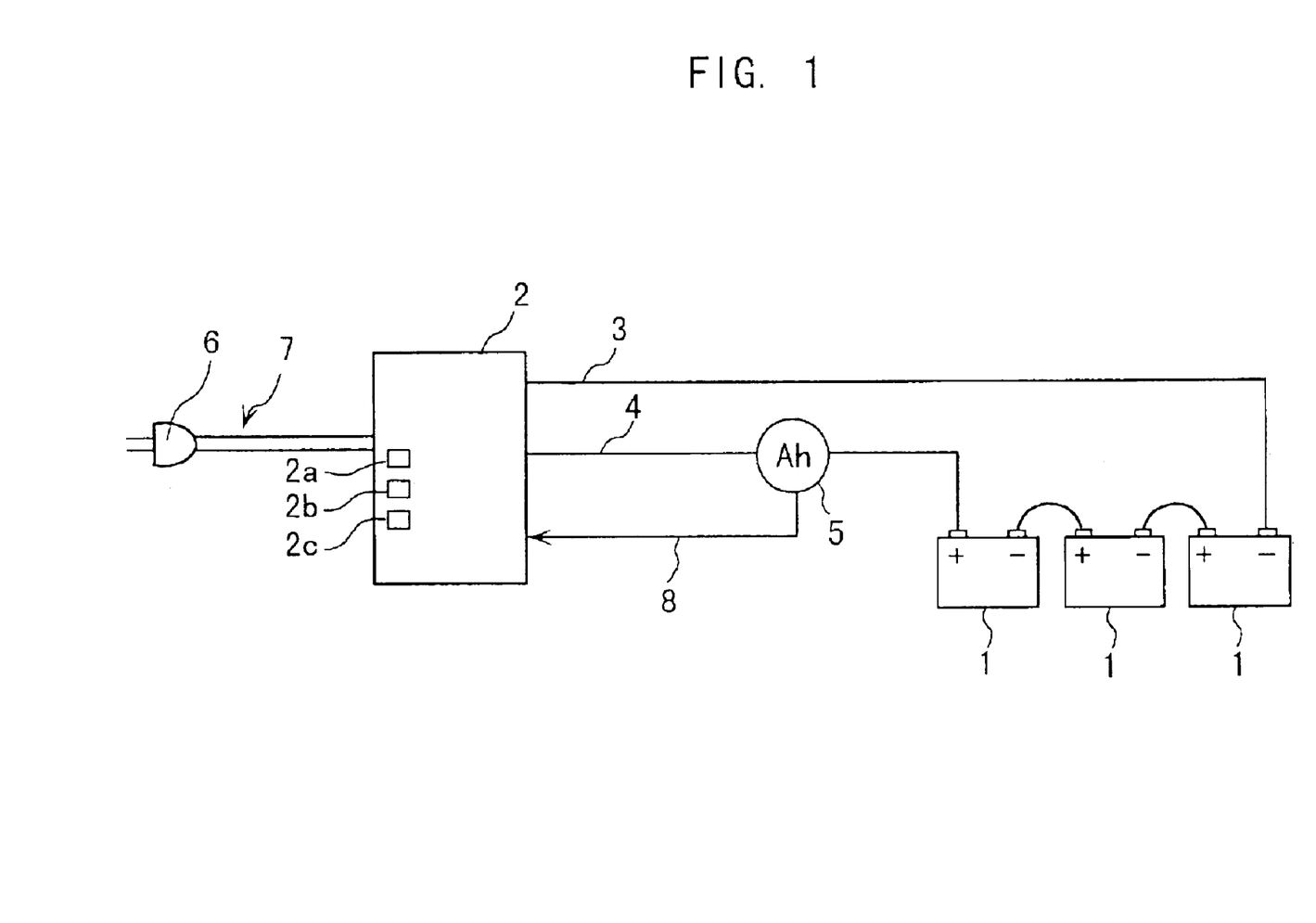
FIG. 1 is a schematic diagram explaining a charging system in a first embodiment of the present invention.
Figure 2:
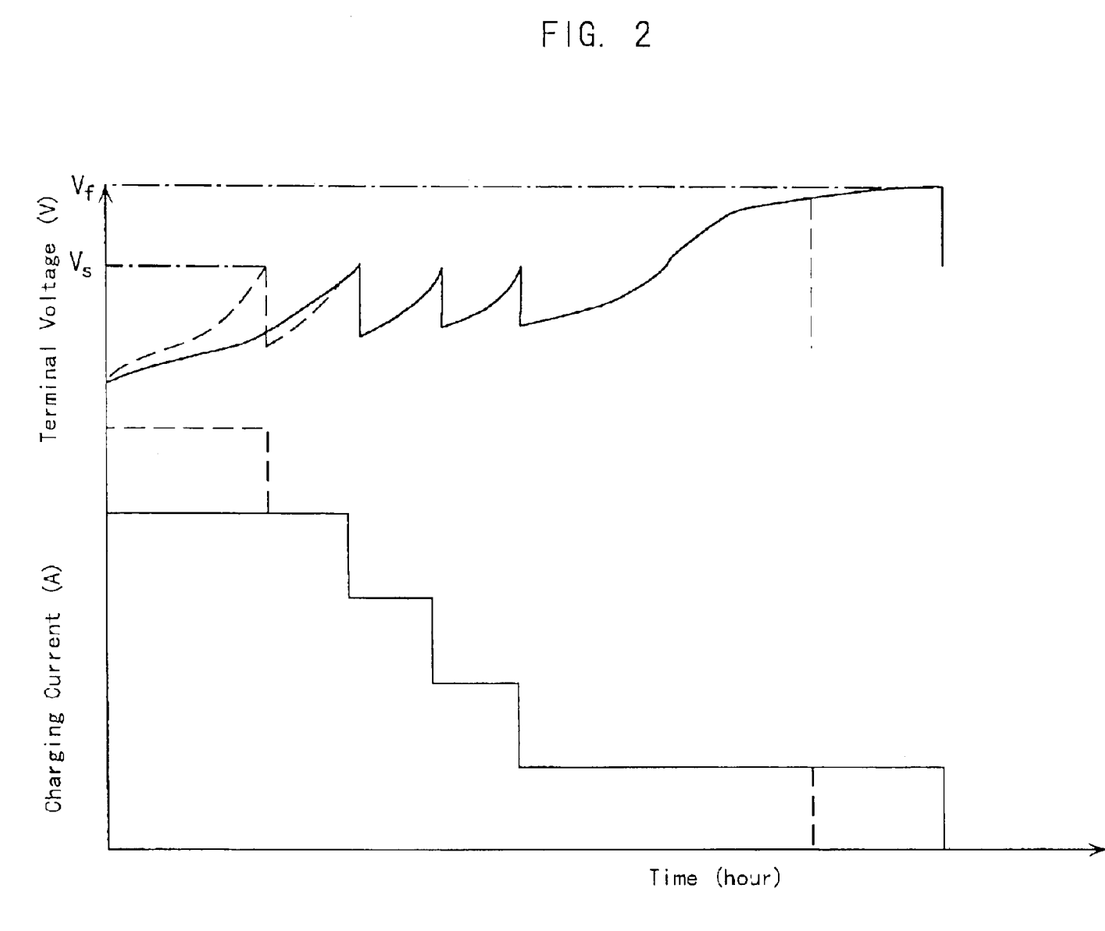
FIG. 2 is a diagram showing a change of a current and a terminal voltage with time in the first embodiment.

A first embodiment of the present invention is referred in accordance in FIGS. 1 and 2. FIG. 1 is a schematic diagram explaining a charging system in the embodiment.

In the embodiment, a set of plural lead storage batteries 1 connected in series (the set of three batteries in FIG. 1) is charged by a battery charging apparatus 2. A negative electrode of the charging apparatus 2 is connected to a negative terminal of a first battery of the set of batteries 1 via a negative charging line 3. A positive electrode of the charging apparatus 2 is connected to a positive terminal of the last battery of the set of batteries 1 via a positive charging line 4 through a residual capacity meter 5. The residual capacity meter 5 is connected to the charging apparatus 2 via a signal line 8.

An alternative electric current supplied to an upstream power line 7 through a plug 6 is rectified to a direct electric current to be supplied to the charging lines 3,4 by the battery charging apparatus 2. The battery charging apparatus 2 comprises a process determining section 2a for determining a process to be executed, a voltage measuring section 2b for measuring a terminal voltage of the set of batteries 1, and a current charging section 2c for charging the set of batteries 1 with a predetermined constant current.

FIG. 2 is a diagram showing a change of the current and the terminal voltage with time in the embodiment.

At first, a residual capacity of the set of batteries 1, that is, a depth of discharge of the set of batteries 1, is measured by the residual capacity meter 5 immediately before charging, and a result of the measurement is transmitted from the residual capacity meter 5 to the charging apparatus 2 via the signal line 8.

The process determining section 2a determines to execute a four-stage constant current charging process as a normal charging process as shown with a solid line of FIG. 2 when the depth of discharge is not deeper than a reference depth of discharge In this embodiment, the reference depth of discharge is predetermined so that the set of batteries 1 having the reference depth of discharge is fully charged with the normal charging process at the end of a time during which the discount commercial power rate is applied, for example, a midnight time from 10 PM to 6 AM of the next morning. The current charging section 2c first charges the set of batteries 1 with an initial current $I_1$. The terminal voltage V of the set of batteries 1 is monitored by the voltage measuring section 2b during charging, and the current I for charging is decreased stepwise by the current charging section 2c every time the terminal voltage V monitored by the voltage measuring section 2b coincides with a predetermined current switching voltage $Vs$. The normal charging process stops when the terminal voltage V in the fourth stage reaches a final charge voltage $Vf$.

The process determining section 2a determines to execute an additional charging process when the depth of discharge is deeper than the reference depth of discharge. In this case, the current charging section 2c first charges the set of batteries 1 with an additional current larger than the initial current $I_1$ in the four-stage constant current charging process, and then switches the additional current to the initial current $I_1$, when the terminal voltage V monitored by the voltage measuring section 2b coincides with the current switching voltage $V_s$ as shown with a broken line of FIG. 2. The above four-stage constant current charging process is carried out after the additional charging process.

The time required for charging is largely shortened as shown with the broken line of FIG. 2 when the depth of discharge is deeper than the reference value, because the additional charging process using the additional current larger than the initial current $I_1$ is executed before the normal charging process. Therefore, the set of batteries 1 having the depth of discharge deeper than the reference value can be fully charged within the midnight time during which the discount commercial electric power rate is applied in case that the charging starts at the beginning of the midnight time. The quick and low cost charging of the lead storage batteries is possible to do by this embodiment.

It is preferable for lead storage batteries loaded in an electric vehicle to be finished charging just at the end of the midnight time and to be driven as soon as possible after charging. The lead storage batteries are most active just after charging. Therefore, this way leads to a longer mileage per hour as well as the quick and low cost charging.

(Second Embodiment)

A second embodiment is a variation of the first embodiment. In this embodiment, the additional current in the additional process depends on the depth of discharge of the set of storage batteries 1.

Figure 3:
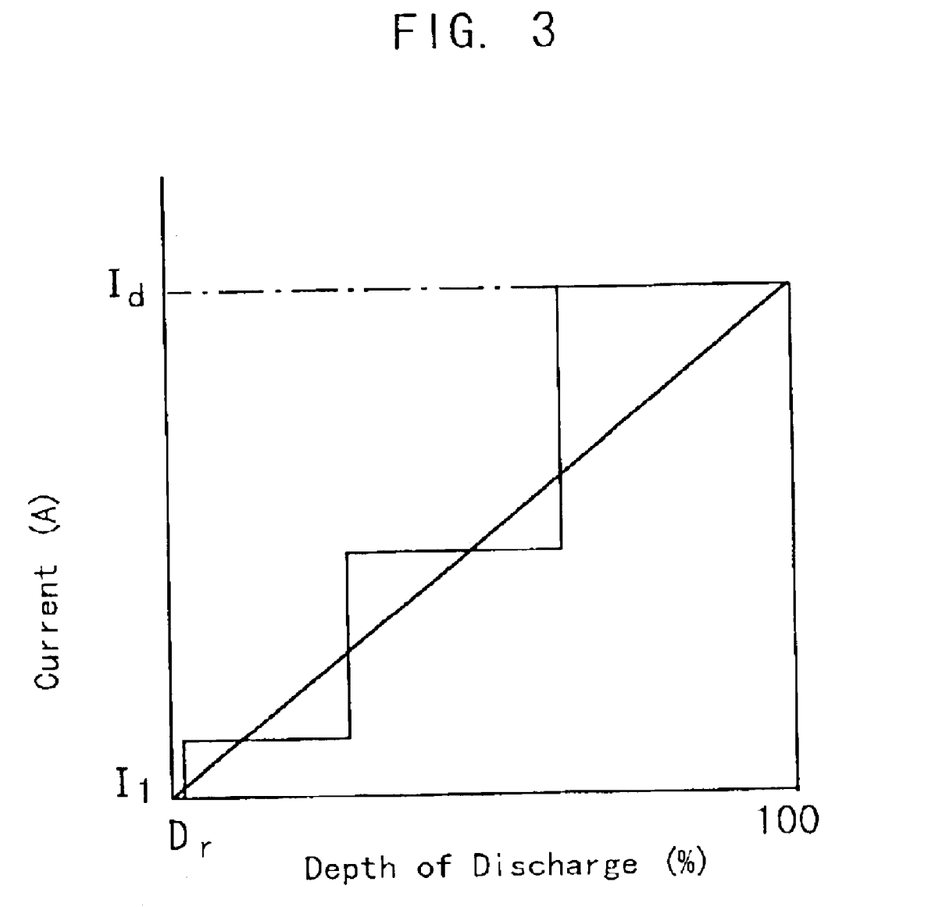
FIG. 3 is a diagram showing a relationship between a depth of discharge of a battery and a current in an additional charging process in a second embodiment of the present invention.

FIG. 3 is a diagram showing a relationship between the depth of discharge and the additional current in this embodiment. The symbol $D_r$ denotes the reference depth of discharge of the set of batteries 1. The symbol $I_d$ ($I_d > I_1$) denotes the additional current in the additional charging process at a final discharge voltage. The additional current is set so that the additional current increases stepwise or continuously as the depth of discharge increases. The current $I_d$ is selected so that a reduction in the life of the set of batteries 1 does not accelerate. A current too large for charging frequently leads to thermal runaway or deterioration, that is, too short life of the set of batteries 1. The current $I_d$ is carefully selected in consideration of various factors such as structures and sizes of the batteries and temperature of the surroundings. The current charging section $2_c$ charges the set of batteries 1 with the additional current predetermined in the above manner in the additional charging process.

The temperature increase and deterioration of the battery during the quick charging can be advantageously controlled with respect to the depth of discharge by this embodiment.

(Third Embodiment)

Figure 4:
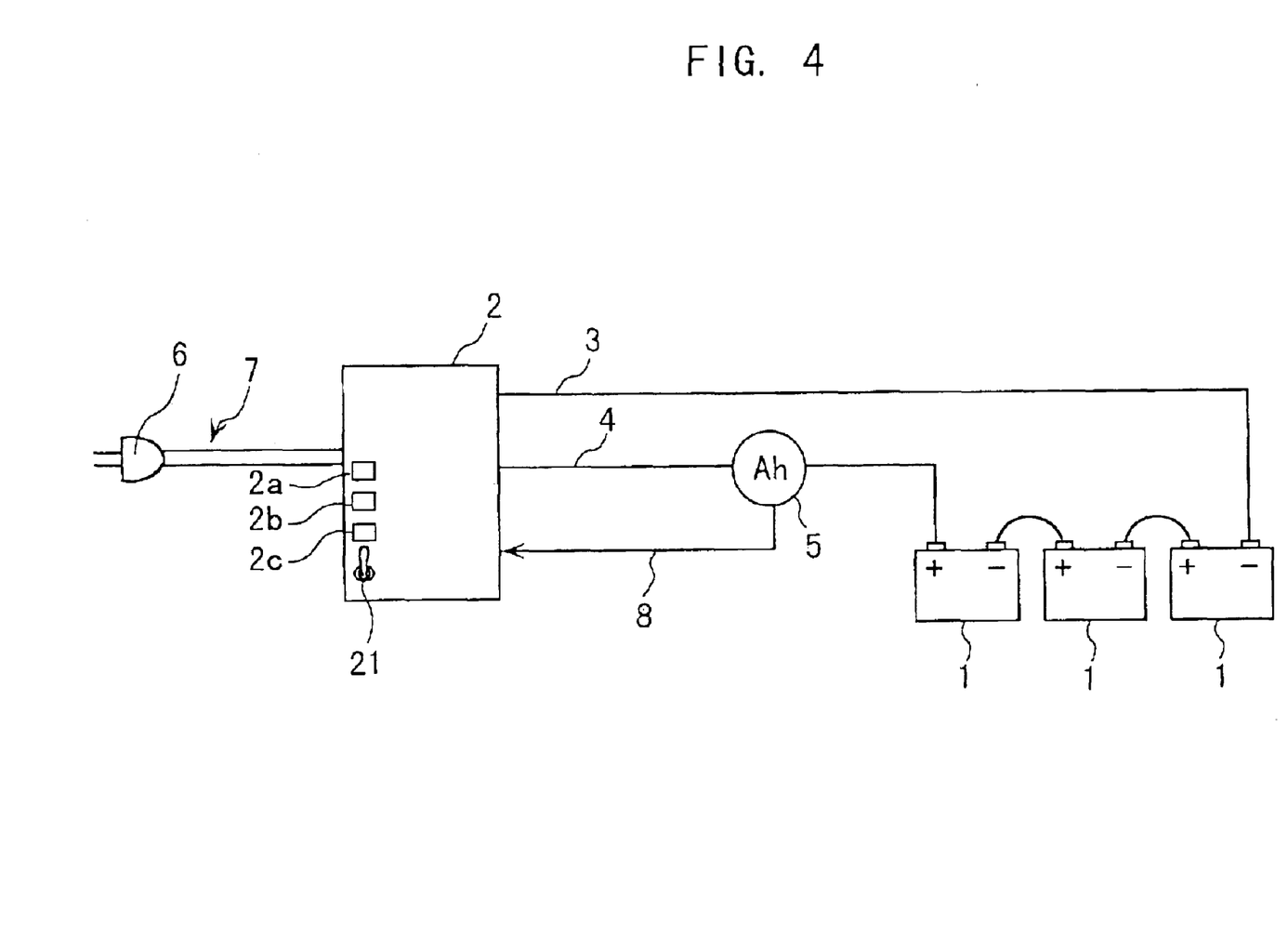
FIG. 4 is a schematic diagram explaining a charging system in a third embodiment of the present invention.

A third embodiment is a variation of the first or second embodiment. FIG. 4 is a schematic diagram explaining a charging system in this embodiment. The system is the same as the system in the first embodiment, except that a selecting switch 21 for selecting one of a normal charging mode and an additional charging mode is provided with the battery charging apparatus 2. When the normal charging mode is selected, the normal four-stage constant current charging process is executed even if the depth of discharge of the set of batteries 1 measured by the residual capacity meter 5 is deeper than the reference depth of discharge. The process determining section 2a of the battery charging apparatus 2 determines to execute the additional charging process in the first or second embodiment only when the additional charging mode is selected and the depth of discharge of the set of batteries 1 is deeper than the reference depth of discharge. That is to say, the quick charging with the additional charging process is carried out as required, for example, when a user of the embodiment wants to do urgent quick charging or wants to do charging by using the discount commercial electric power.

(Fourth Embodiment)

Figure 5:
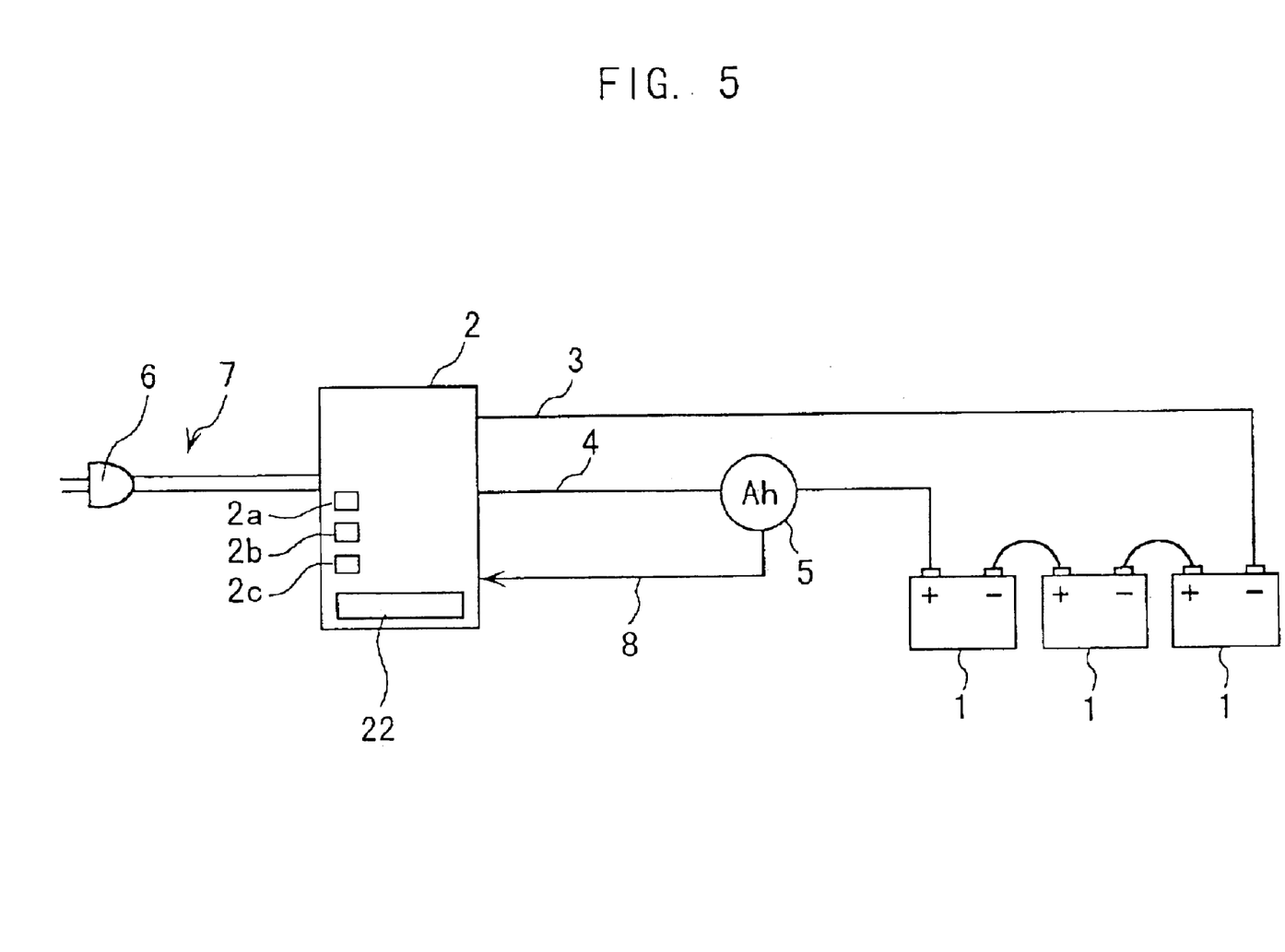
FIG. 5 is a schematic diagram explaining a charging system in a fourth embodiment of the present invention.

A fourth embodiment is another variation of the first or second embodiment. FIG. 5 is a schematic diagram explaining a charging system in this embodiment. The system is the same as the system in the first embodiment, except that a time checking section 22 is provided with the battery charging apparatus 2 for detecting a starting time of charging. The starting time of charging can be detected by receiving a switch-on signal of a starting switch (not shown in FIG. 5) provided with the battery charging apparatus 2 on condition that the plug 6 is connected to a commercial power supply and the alternative electric current is supplied to the upstream charging line 7.

In this embodiment, the process determining section 2a of the battery charging apparatus 2 determines to execute the additional charging process in the first or second embodiment only when the starting time of charging is within a time predetermined for charging and the depth of discharge of the set of batteries 1 measured by the residual capacity meter 5 is deeper than the reference depth of discharge. The time for charging is predetermined so as to level off commercial electric power consumption per hour. If a user of this embodiment wants to charge many sets of batteries 1, the time for charging can be changed for each set of batteries. If the time during which the discount commercial electric power rate is applied is chosen as the time for charging, the embodiment provides low cost charging as well as the leveling off the commercial electric power consumption per hour.

(Fifth Embodiment)

Figure 6:
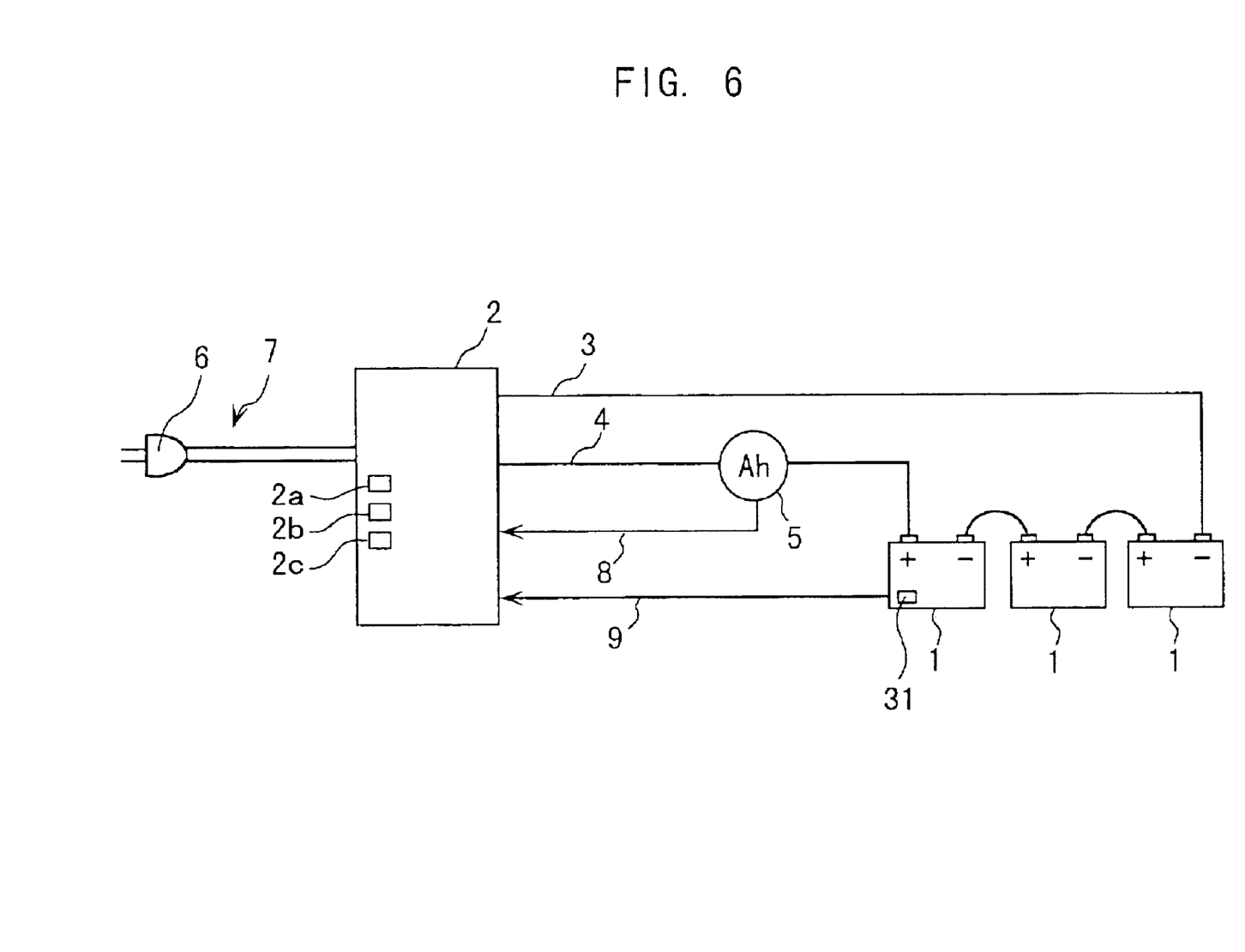
FIG. 6 is a schematic diagram explaining a charging system in a fifth embodiment of the present invention.

A fifth embodiment is another variation of the first or second embodiment. FIG. 6 is a schematic diagram explaining a charging system in this embodiment. The system is the same as the system in the first embodiment, except that a thermal sensor 31 is provided with one battery of the set of batteries 1 connected in series. A temperature of the battery 1 is detected by the thermal sensor 31 immediately before charging, and a result of the detection is transmitted to the battery charging apparatus 2 via a signal line 9.

In this embodiment, the process determining section 2a of the battery charging apparatus 2 determines to execute the additional charging process in the first or second embodiment only when the temperature of the battery is lower than a temperature at which a reduction in the life of the set of batteries 1 begins to accelerate and the depth of discharge of the set of batteries measured by the residual capacity meter 5 is deeper than the reference depth of discharge. A temperature of the set of batteries which is too high frequently leads to thermal runaway or deterioration, that is, too short life of the set of batteries. The temperature at which the reduction in the life of the set of batteries begins to accelerate depends on various factors such as structures and sizes of the batteries and temperature of the surroundings and is obtained from preliminary tests. Too short life of the set of batteries 1 is prevented by the embodiment.

(Sixth Embodiment)

Figure 7:
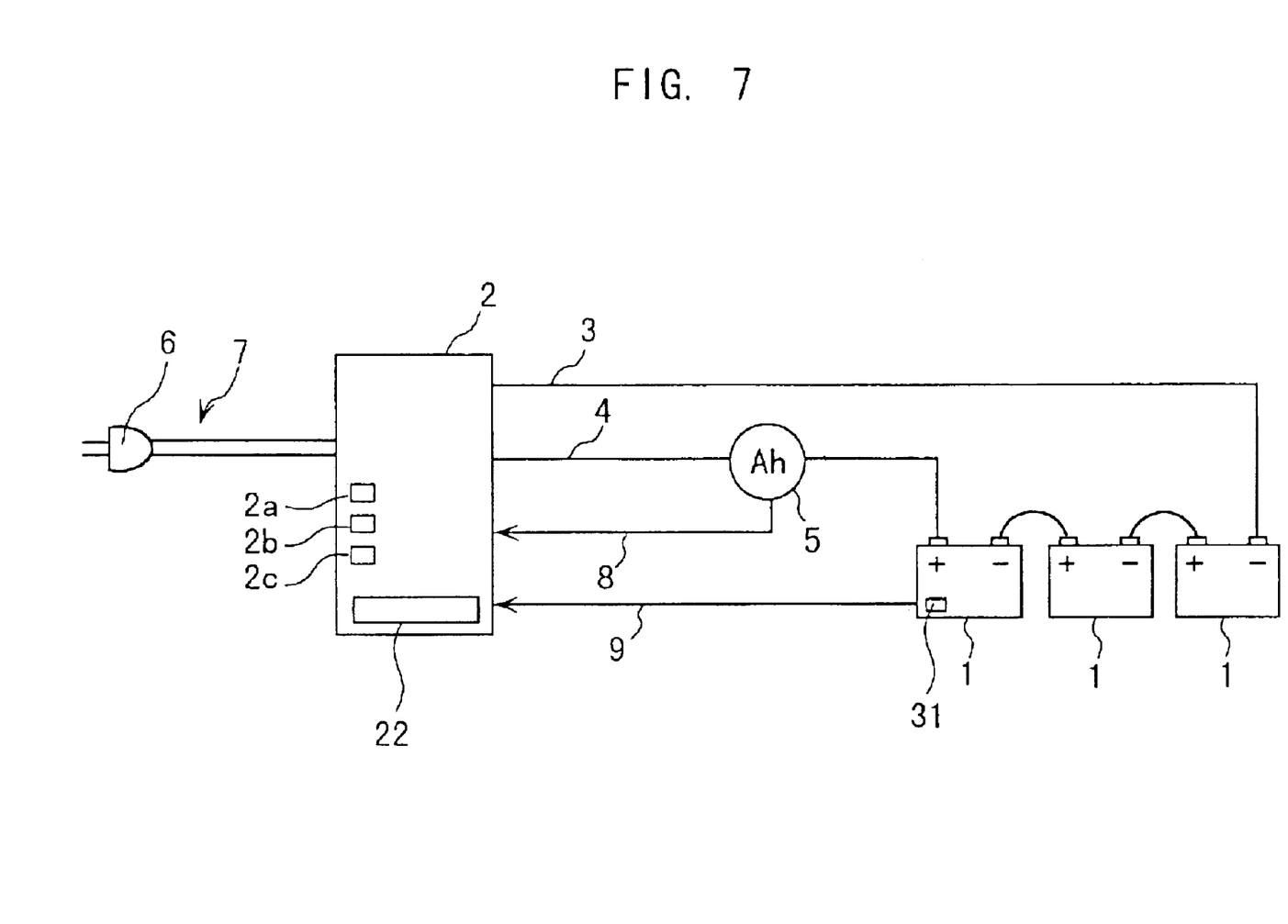
FIG. 7 is a schematic diagram explaining a charging system in a sixth embodiment of the present invention.

A sixth embodiment is a variation of the fifth embodiment. FIG. 7 is a schematic diagram explaining a charging system in this embodiment. This system is the same as the system in the fifth embodiment, except that the time checking section 22 as mentioned above is provided with the battery charging apparatus 2.

In this embodiment, the process determining section 2a determines to execute the additional charging process in the first or second embodiment only when the temperature of the battery 1 is lower than the temperature at which the reduction in the life of the battery begins to accelerate and the starting time of charging is within the time predetermined for charging and the depth of discharge of the set of batteries 1 measured by the residual capacity meter 5 is deeper than the reference depth of discharge. Hence, a shortening of the life of the set of batteries 1 is prevented and the leveling off the commercial electric power consumption per hour is achieved at the same time by this embodiment.

(Seventh Embodiment)

A seventh embodiment is another variation of the fifth embodiment. In this embodiment, the additional current in the additional charging process depends on the temperature of the storage battery 1 detected by the thermal sensor 31.

Figure 8:
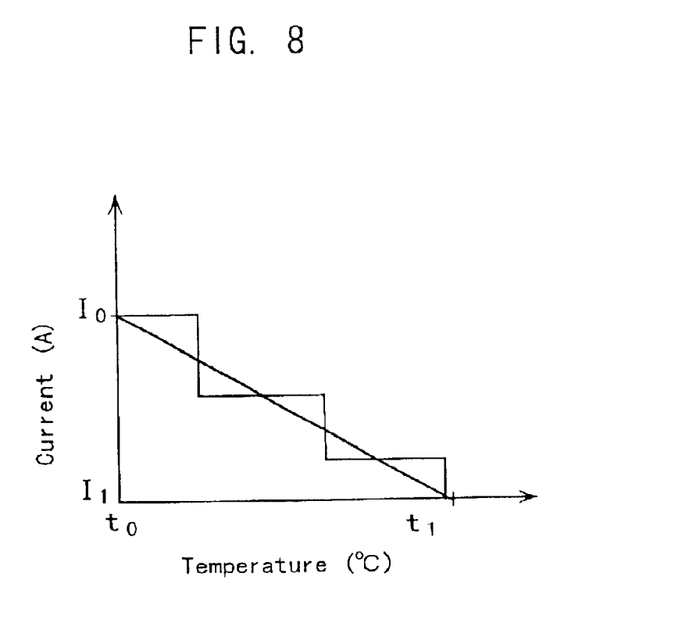
FIG. 8 is a diagram showing a relationship between a temperature of a battery and a current in an additional charging process in a seventh embodiment of the present invention.

FIG. 8 is a diagram showing a relationship between the temperature of the battery 1 and the additional current in the additional charging process in this embodiment. The symbol $I_0$ ($I_0 > I_1$) denotes the largest current permitted. The symbol $t_1$ and $t_0$ ($t_1 > t_0$) denote, respectively, the temperature of the battery 1 at which the reduction in the life of the set of batteries 1 begins to accelerate and the temperature at which the largest current is applied to the set of batteries. The additional current is set so that the additional current increases stepwise or continuously as the temperature of the battery 1 increases. The temperature $t_1$ depends on various factors and is predetermined from preliminary tests. Both of the current $I_0$ and the temperature $t_0$ are selected so that the reduction in the life of the set of batteries 1 does not accelerate in consideration of various factors such as structures and sizes of the batteries and temperature of the surroundings. As mentioned above, too high temperature because of too large current leads to too short life of the set of batteries 1. The current charging section 2c of the battery charging apparatus 2 charges the set of batteries 1 with the additional current predetermined in the above manner in the additional charging process.

The temperature increase and deterioration of the set of batteries 1 during the quick charging can be minimized by the embodiment.

(Eighth Embodiment)

Figure 9:
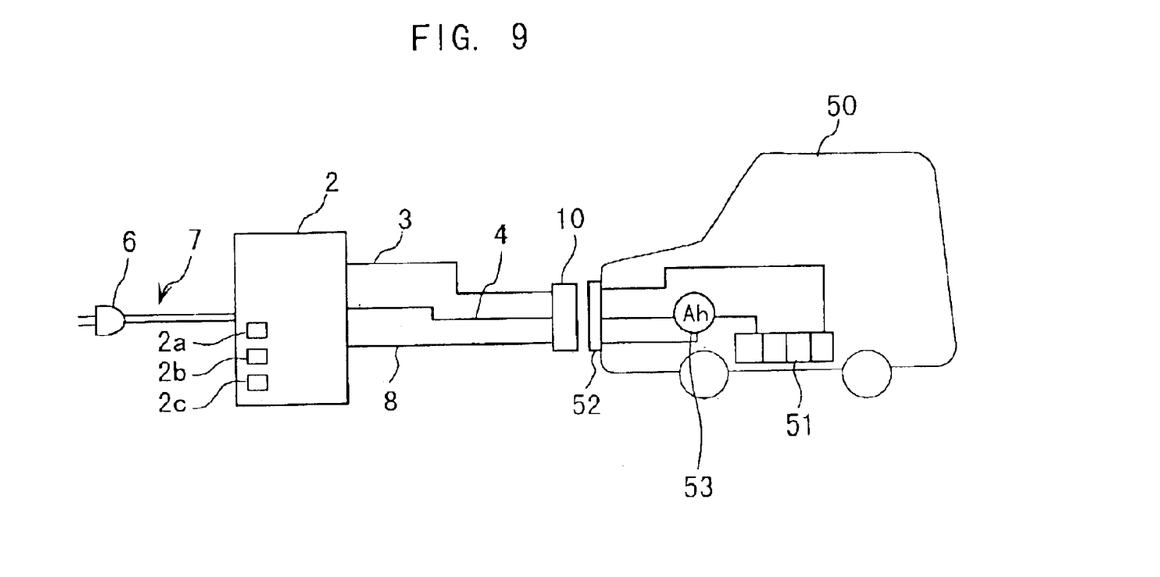
FIG. 9 is a schematic diagram explaining a charging system in an eighth embodiment of the present invention.

An eighth embodiment is another variation of the first or second embodiment. FIG. 9 is a schematic diagram explaining a charging system in this embodiment. A set of plural lead storage batteries 51 loaded in an electric vehicle 50 is charged by the battery charging apparatus 2. The charging lines 3,4 and the signal line 8 from the battery charging apparatus 2 are connected to a terminal for charging 52 provided with the electric vehicle 50 through a connector 10 for applying the current of the charging apparatus 2 to the set of batteries 51 and for inputting the depth of discharge of the set of batteries 51, which is measured by a radial capacity meter 53 provided with the electric vehicle 50, to the battery charging apparatus 2. When the depth of discharge is deeper than the reference depth of discharge, the additional charging process in the first or second embodiment is executed before the normal four-stage constant current charging process and the set of lead storage batteries 51 loaded in the electric vehicle 50 is charged very quickly.

In this embodiment, the depth of discharge of the set of batteries 51 is measured by the radial capacity meter 53 which is primarily provided with the electric vehicle 50. Hence, an additional radial capacity meter is needless and a low cost charging system can be structured.

The four-stage constant current charging process as the normal charging process in any of the above embodiments can be extended to the n(n≧2)-stage constant current charging process in this invention. Besides, the additional current in the additional charging process in the seventh embodiment can be changed in dependency on both the depth of discharge and the temperature of the battery. Furthermore, the selecting switch for selecting one of the normal charging mode and the additional charging mode, the time checking section for detecting the starting time of charging, and the thermal sensor for detecting the temperature of the battery can be also provided in the eighth embodiment to obtain advantageous effects of the above embodiments 3~7. The disclosure of Japanese Patent Application 2002-088542, filed on Mar. 27, 2002 is incorporated herein by reference in its entirety.

The present invention being thus described, it will be clearly understood that the same may be varied in many ways. Such variations are not to be regarded as a departure from the spirit and scope of the present invention, and all such modification as would be understood to one skilled in the art are intended to be included within the scope of the following claims.

What is claimed is:

1. A method of charging a storage battery comprising executing an n(n≧2)-stage constant current charging process charging the battery with a constant current while monitoring a terminal voltage of the battery, the current decreasing stepwise n−1 times every time the terminal voltage coincides with a current switching voltage, wherein, the method further comprises:

measuring a depth of discharge of the battery immediately before charging; and executing an additional charging process before the n-stage constant current charging process when the depth of discharge is deeper than a reference depth of discharge, the additional charging process charging the battery with an additional constant current larger than an initial current in the n-stage constant current charging process and switching the additional current to the initial current when the terminal voltage coincides with the current switching voltage.

2. The method of charging the storage battery as claimed in claim 1, wherein, the storage battery is a lead storage battery.

3. The method of charging the storage battery as claimed in claim 1, wherein, the additional current in the additional charging process is set so that the additional current increases stepwise as the depth of discharge of the battery increases.

4. The method of charging the storage battery as claimed in claim 1, wherein, the additional current in the additional charging process is set so that the additional current increases continuously as the depth of discharge of the battery increases.

5. The method of charging the storage battery as claimed in claim 1, wherein, the method further comprises selecting one of a normal charging mode and an additional charging mode, and the additional charging process is executed only when the additional charging mode is selected.

6. The method of charging the storage battery as claimed in claim 1, wherein, the method further comprises detecting a starting time of charging, and the additional charging process is executed only when the starting time of charging is within a time predetermined for each of the battery so as to level off commercial electric power consumption per hour.

7. The method of charging the storage battery as claimed in claim 1, wherein, the method further comprises detecting a starting time of charging and the additional charging process is executed only when the starting time of charging is within a time during which a discount commercial electric power rate is applied.

8. The method of charging the storage battery as claimed in claim 1, wherein, the method further comprises detecting a temperature of the storage battery immediately before charging, and the additional charging process is executed only when the temperature of the battery is lower than a temperature at which a reduction in the life of the battery begins to accelerate.

9. The method of charging the storage battery as claimed in claim 6, wherein, the method further comprises detecting a temperature of the storage battery immediately before charging, and the additional charging process is executed only when the temperature of the battery is lower than a temperature at which a reduction in the life of the battery begins to accelerate.

10. The method of charging the storage battery as claimed in claim 7, wherein, the method further comprises detecting a temperature of the storage battery immediately before charging, and the additional charging process is executed only when the temperature of the battery is lower than a temperature at which a reduction in the life of the battery begins to accelerate.

11. The method of charging the storage battery as claimed in claim 8, wherein, the additional current of the additional charging process is set so that the additional current decreases stepwise as the temperature of the battery increases.

12. The method of charging the storage battery as claimed in claim 8, wherein, the additional current of the additional charging process is set so that the additional current decreases continuously as the temperature of the battery increases.

* * * * *

UNITED STATES PATENT AND TRADEMARK OFFICE
CERTIFICATE OF CORRECTION

PATENT NO. : 6,781,348 B2
DATED : August 24, 2004
INVENTOR(S) : Yutaka Yokoyama It is certified that error appears in the above-identified patent and that said Letters Patent is hereby corrected as shown below:

<u>Title page,</u>
Item [75], Inventor, change "Yokohama" to -- Yokoyama --

Signed and Sealed this

Twenty-fourth Day of May, 2005

JON W. DUDAS
*Director of the United States Patent and Trademark Office*